Dec. 1, 1942.  D. SCARAMUCCI  2,303,392
SHEAR-RELIEF VALVE
Filed Oct. 16, 1939   2 Sheets—Sheet 1

Inventor
Domer Scaramucci
By Leech & Radue
Attorneys

Dec. 1, 1942.  D. SCARAMUCCI  2,303,392
SHEAR-RELIEF VALVE
Filed Oct. 16, 1939  2 Sheets-Sheet 2
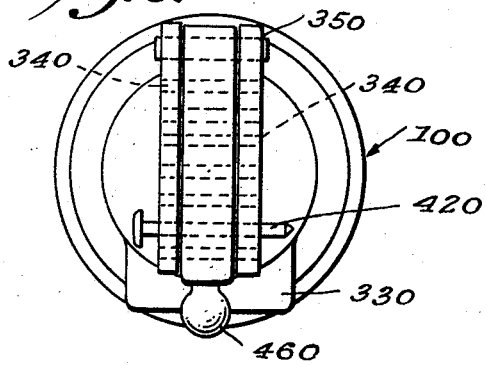
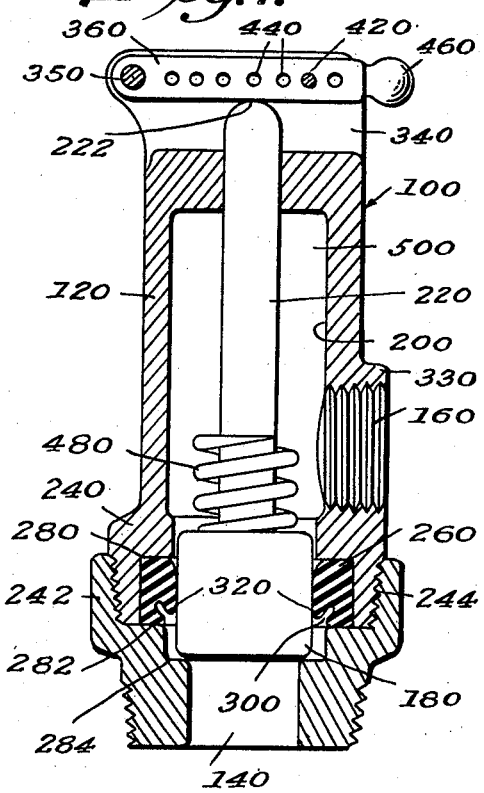
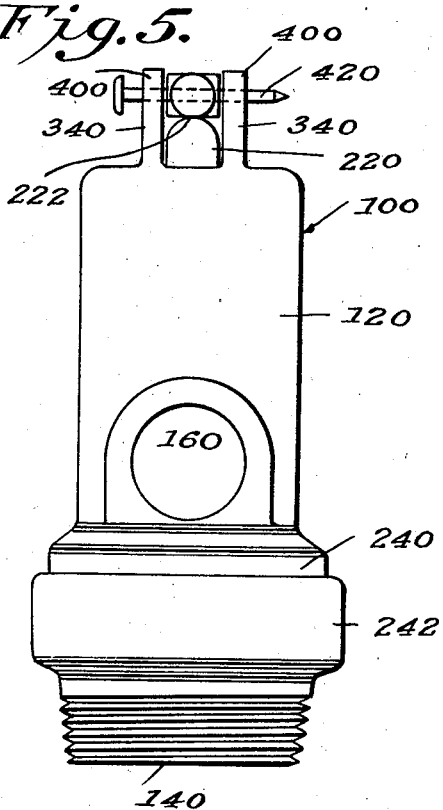
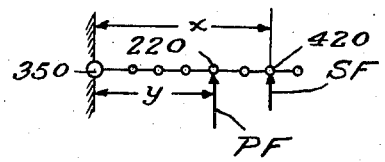
Inventor
Domer Scaramucci
By Leech + Radue
Attorneys Patented Dec. 1, 1942

2,303,392

UNITED STATES PATENT OFFICE 2,303,392

SHEAR-RELIEF VALVE

Domer Scaramucci, Oklahoma City, Okla., assignor to Oil Equipment Engineering Corporation, Oklahoma City, Okla., a corporation of Oklahoma Application October 16, 1939, Serial No. 299,759

14 Claims. (Cl. 137—53)

This invention relates to shear-relief valves, and particularly, to improved means for varying the relief pressure to which such valves may be set.

In devices of this nature, it is a general object to provide valve construction designed to remain closed to fluid flow in its normal position and adapted to permit the instantaneous release of excessive fluid pressure. Safety features reside in the function of preventing undue fluid pressure increases in flow lines which would damage costly equipment and endanger the workmen using it. One of the contemplated applications of the present invention is to the high pressure or delivery end of slush pumps which are used in oil well drilling operations. When so installed, the simple and efficient valve construction herein provided will protect not only the slush pump itself, but the drilling hose, fluid ends and manifolds comprising the familiar rotary drill installation.

In the accomplishment of these objects, a feature of the invention consists in the provision of an organization of valve parts which permits the use of a single, simple shearable member for any one of a range of predetermined relief pressures.

Both the preferred and alternative embodiments of the invention herein to be disclosed provide means for varying the effective shearing forces on the shearable member or pin by placing said shear pin in one of a plurality of optional positions.

Another specific object which this invention attains is the provision of a valve construction utilizing a single size shearable member for a number of pressure settings, and thus minimizing the complexity of the valve organization and its operation.

Among the additional specific objects are the provision of novel means for sealing the valve in its closed position and for cushioning the valve as it opens rapidly in response to excessive fluid pressure.

Other features of improvement are to be found in the detailed nature and arrangement of the elements of valve construction designed to increase efficiency and to reduce the cost of manufacture. These will be readily understood from considering the following detailed description of two illustrative embodiments of the invention in connection with the accompanying drawings, in which Fig. 1 is a side elevation of the shear-relief valve;

Fig. 5 is a side elevation of a modified form of the valve construction;

Fig. 6 is a top plan view of the same valve construction;

Fig. 7 is a vertical section of the modified form; and

Fig. 8 is a further diagram illustrating the manner of application of shearing force in the modified valve construction.

Figure 2:
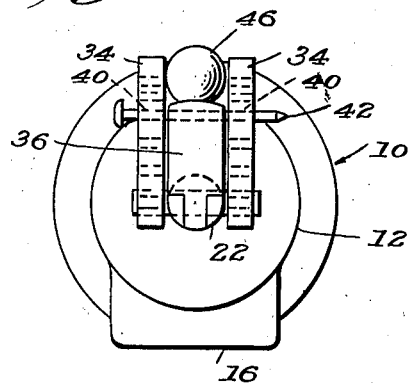
Fig. 2 is a top plan view of the same.
Figure 1:
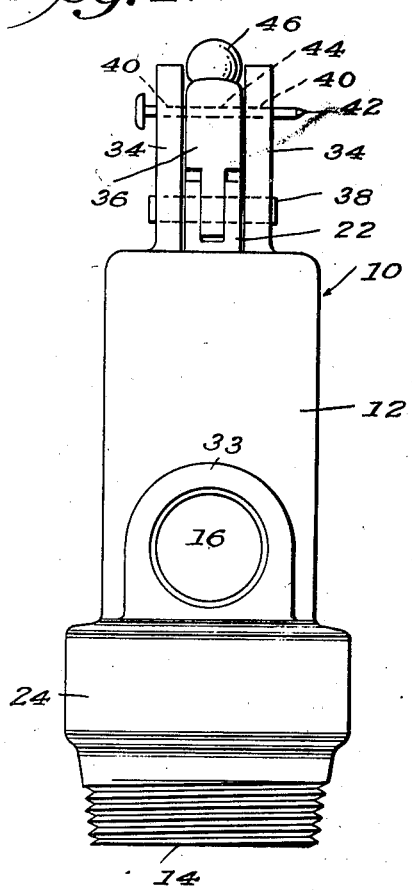
Figure 3:
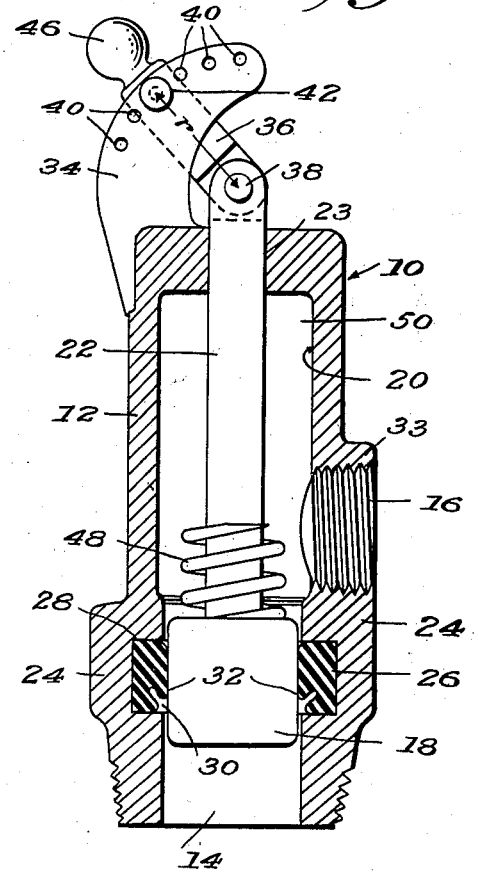
Fig. 3 is a vertical section showing certain details of construction.

In the drawings, 10 represents generally an assembled valve construction which includes a unitary valve housing 12 having an inlet or pressure opening 14 at its lower end, as seen in Fig. 3, and an intermediate lateral discharge opening 16. Any suitable form of T-fitting may be used to connect the inlet or pressure opening 14 to the fluid flow line (not shown).

It will be seen also in Fig. 3 that a valve means in the form of a piston 18 is mounted for reciprocation within a generally uniform bore 20 of the elongated valve housing 12. For reasons to be explained, the piston valve 18 has an upwardly extending valve stem projecting through housing guide bore 23 and above the upper end of said housing 12 when the valve piston is in the closed position shown. Adjacent this position of valve piston 18, the housing 12 has a cylindrical enlargement 24 to accommodate a resilient seal member or packing ring 26, of rubber-like material, which is retained in an annular channel groove 28 so as to engage the periphery of valve piston 18. The section of Fig. 3 indicates that the resilient sealing ring 26 is undercut at 30 to provide a downwardly extending lip 32 near its inner bottom edge. When the valve 18 is in closed position and fluid pressure from a flow line is applied to its underside, the lip 32 will be expanded inwardly in order tightly to seal the valve, which is ordinarily metallic.

Preferably, a boss 33 extends above the cylindrical enlargement 24 and provides the discharge opening 16.

Above one side of the upper end of valve housing 12 extend a pair of spaced parallel arms 34, 34 between which fits a shear lever arm 36 which is pivotally connected at its lower end to the exposed end of valve stem 22, as by pivot means 38, the center of the pivoted connection being on the longitudinal axis of the valve bore 20. Attention is next called to the series of aligned pairs of openings 40, 40 in the parallel arms 34, 34 for receiving a shearable member or pin 42, which may be an ordinary wire nail. In the shear lever arm 36 is a corresponding opening 44 adapted for alignment with any opening pair 40, 40. The openings 40 are disposed on an arcuate center line having the common radius $r$ which represents the distance from the center of pivot means 38 to the center of each pair of openings 40, 40 and of the shear pin 42 inserted in a given pair of openings. A rounded end or handle 46 extending beyond the parallel arms 34, 34 facilitates replacement of the shearable member 42.

The surge of pressure when the shear member 42 is severed will drive the piston valve 18 upwardly at a high speed. To reduce the impact of the piston 18 on the upper end of valve housing 12, a short length of coil spring 48 is mounted loosely above the upper end of said piston valve 18 for cooperation with the top or closed end of the housing 12. The coil spring or resilient cushion means 48 is preferably disposed around the valve stem 22 and is made appreciably shorter than the length of the valve bore 20 between the closed end of that bore and the valve piston 18 when the latter is in its normally closed position. Auxiliary cushioning means in the form of a compression chamber space 50 formed by extending the bore 20 of valve housing 12 may suffice.

After the valve construction described above has been assembled in a pressure line, and before pressure has been placed thereon, the operator will insert a nail 42 through a selected pair of openings 40, 40 in the fixed arms 34 so as to pass also through the similar opening 44 in the shear lever arm 36, these parts having a loose or sliding fit. This will retain the valve piston 18 in the normal position of Fig. 3 which closes the pressure or inlet opening 14 to the intermediate discharge opening 16, which may be exposed to atmospheric pressure. As previously noted, the fluid pressure on the underside of the valve piston 18 will act also upon the sealing ring 26 and cause its lip 32 to expand inwardly against said piston valve. Should the line pressure become great enough to shear the pin 42, the piston valve 18 would be urged upwardly instantaneously to relieve pressure by opening the line to the discharge opening 16. Some air would be trapped temporarily in the cushioning chamber space 50 at the upper end of the valve bore 20, and this would be compressed by the piston valve 18. The spring 48 would serve as a shock absorber.

Figure 4:
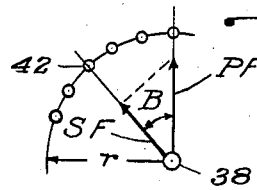
Fig. 4 is a diagram illustrating the manner of application of the shearing force.

The nature of the shearing forces acting on the pin 42 have been illustrated in Fig. 4. If the vertical pressure force, PF, acting through the valve stem 22 has the magnitude indicated by the vector so designated in this figure, then the effective shearing force, SF, along the shear lever arm 36 will be a component of that vertical force. That is, when an angle $\beta$ exists between the axis of stem 22 and that of lever arm 36:

$$SF = PF \cos \beta$$

Changing the size of angle $\beta$ by selecting a different pair of aligned openings 40, 40 will give a predetermined variation in the relief pressure for the valve.

Referring to the modified form of the invention illustrated in Figs. 5, 6, 7 and 8, it will be observed that the valve construction 100 is quite similar in many respects to that which has been described in detail. Therefore, only the points of difference will be emphasized.

A valve housing 120 is likewise provided with a pressure or inlet opening 140 and an intermediate lateral discharge opening 160. A corresponding piston valve 180 is reciprocable in a bore 200 of the housing 120 and has an upwardly extending valve stem 220 with a rounded bearing end 222 protruding above the upper end of said housing. A cylindrical enlargement 240 at the lower end of the housing 120 is received within a fitting 242, having threaded engagement at 244. A resilient sealing ring 260 for valve piston 180 is retained by an annular channel groove 280 formed between enlargement 240 and an inner, continuous shoulder 282 on the fitting 242, said fitting 242 having also a somewhat lower shoulder 284 for retaining the valve 180 when the construction is assembled. The resilient sealing ring 260 is undercut at 300 to provide an inwardly expansible lip 320 identical with that described for its counterpart in the principal embodiment.

Further note is taken that a boss 330 forms an upward continuation of the cylindrical enlargement 240 and has the discharge opening 160 therethrough.

A pair of spaced vertical walls 340, 340 extend in parallel relation equi-distant from a diameter of the upper end of housing 120, and have pivoted therebetween by means of a substantial pin connection 350 a compression member or shear lever arm 360 which extends horizontally when in its normal position. The generally rectangular shape of the rigid arm 360 and the nature of its fit between the walls 340, 340 is shown best in Figs. 5 and 6, the former indicating also the manner in which the rounded end 222 of the valve stem 220 bears against the underside of the shear lever arm 360.

Spaced pairs of aligned openings 400, 400 extend through the walls 340, 340 transversely of the valve construction 100 so as to register also with a corresponding series of openings 440, 440 in the shear lever arm 360 in order that a shearable pin or member 420 can be passed through any three aligned openings.

It will be quite obvious that the pivot 350 provides a substantial fulcrum point for the lever arm 360 and that the force of the pressure fluid, PF, in the line to which the valve construction 100 is connected will exert a shearing force, SF, on the pin or nail 420 which may be varied in effective magnitude.

For example, with the shearable pin or nail 420 in the position shown by Fig. 7 and referring to the diagram of Fig. 8 in which the shearing force, SF, is effective at a point $x$ distance from pivot point 350, and the pressure force, PF, at a distance $y$ from the same point, it will be apparent that the relation of forces is:

$$SF = PF \cdot y/x$$

Accordingly, the shearing force, SF, and the pressure force, PF, will be equal when the pin is placed in the position corresponding to the longitudinal axis of the valve stem 220.

The description of this embodiment will be completed substantially by referring to a handle 460 on the free end of shear lever arm 360, the optional or auxiliary cushioning spring 480 between the closed end of housing 120 and the piston 180, and a cushion chamber 500 which is formed by extending the housing bore 200. Other details of assembly and use of the modified form of the valve construction will be observed from the foregoing description.

The possibility of objectionable freezing of unused valve parts is eliminated by reason of the fact that the resilient sealing ring (26 or 260) carried by the valve housing (12 or 120) even when stuck to the valve piston is constructed and arranged to yield sufficiently for the shearable member to be severed, after which the parts will be torn apart immediately by the movement of said valve piston in response to high pressure line fluid.

With a common nail as a shearable member, the relief valve of this invention may be set for any one of several predetermined maximum pressures having a definite relationship. Moreover, if a nail of precisely the desired size is not immediately available, compensation can be made by selecting a suitable shearing position. In this manner the cost of maintenance is reduced to a minimum.

To simplify the design and improve the shock-absorbing characteristics of constructions of this nature, the size and length of the housing bore (20 or 200) for the piston valve have been made such as to provide an air cushion which is effective when the shearable member yields.

The preferred form of the invention and the modification which have been disclosed may be varied in a number of ways without departing from the invention as claimed.

Having thus described my invention, what I claim as new and desire to secure by Letters Patent of the United States is:

1. In a shear-relief valve, a housing, a valve body reciprocable in the housing, a stem extending from the valve body and through the housing, a shearable member, means associated with the housing for holding said shearable member in a plurality of different positions varying in distance from the axis of the stem of the valve, and a shearing member operatively connected to the shearable member for holding the valve body in closed position until it is released by failure of the shearable member at a predetermined pressure.

2. In a shear-relief valve, a housing having inlet and outlet openings, a valve body reciprocable in the housing and arranged normally to close the inlet opening, a stem extending from one end of the valve body and through the housing, a shearable memer, means associated with the housing for holding said shearable member in a plurality of different positions varying in distance from the axis of the stem of the valve, and a shearing member operatively connected to the shearable member for transmitting thereto force from the stem.

3. In a relief valve, the combination comprising a housing, a valve body reciprocable in the housing, a shearable member, means for retaining said shearable member in any one of a plurality of positions varying in distance from the path of said valve body, and means for operatively connecting the valve body to the shearable member in any one of the positions of the latter.

4. A shear-relief valve which includes in combination, a housing having inlet and outlet openings, a valve body reciprocable in the housing and arranged normally to close the inlet opening, a stem extending from one end of the valve body, a shear pin, means rigidly connected to the housing and adapted to hold the shear pin in any one of several positions varying in distance from the longitudinal axis of the valve body, and a lever arm operatively connected to the shear pin for transmitting thereto force from the stem and normally resisting opening movement of the valve body.

5. In a shear-relief valve, a unitary housing having inlet and outlet openings, a valve body reciprocable in the housing and arranged normally to close the inlet opening, a stem extending from one end of the valve body and through the housing, a shearable member, means integral with the housing for supporting said shearable member in a plurality of different positions varying in distance from the axis of the stem of the valve, and a shearing arm operatively connected to the shearable member and the stem for transmitting to the member force due to pressure on the valve body.

6. In a shear-relief valve, a housing having inlet and outlet openings, a valve body reciprocable in the housing and arranged normally to close the inlet opening, a stem extending from one end of the valve body and through the housing, a shearable member, means associated with the housing for holding said shearable member in a plurality of different positions varying in distance from the axis of the stem of the valve body, and a compression member operatively connecting the end of the stem to the shearable member.

7. In a shear-relief valve, a housing having inlet and outlet openings, a piston valve reciprocable in the housing and arranged normally to close the inlet opening, a stem extending from one end of the piston valve and through the housing, a resilient valve sealing ring carried by said housing, a shearable member, means associated with the housing for holding said shearable member in a plurality of different positions varying in distance from the axis of the stem of the valve, and a compression member operatively connecting the end of the stem to the shearable member.

8. In a shear-relief valve, a housing having inlet and outlet openings, a valve body reciprocable in the housing and arranged normally to close the inlet opening, a stem extending from one end of the valve body and through the housing, a shearable member, a pair of spaced, parallel arms associated with the housing for holding said shearable member in a plurality of different positions varying in distance from the axis of the stem of the valve body, and a compression member operatively connecting the end of the stem to the shearable member.

9. A valve construction comprising, in combination, a housing provided with an inlet opening aligned with a bore which is closed at its opposite end and a discharge opening intermediate the ends of the bore, a piston valve reciprocable in the bore and arranged normally to close the inlet opening, a valve stem extending from the valve and through the end of the housing opposite the inlet opening, an arm extending beyond the housing adjacent the valve stem and having a plurality of openings therethrough at different distances from the axis of said stem, a shear pin supported in one of the openings of the arm, and a shear lever arm pivotally connected to the stem outside of the housing and to the shear pin for fracturing said pin in response to predetermined pressure on the piston valve.

10. A valve construction comprising, in combination, a housing provided with an inlet opening aligned with a bore which is closed at its opposite end and a discharge opening intermediate the ends of the bore, a piston valve reciprocable in the bore and arranged normally to close the inlet opening, an expansible, resilient sealing ring carried by the housing to engage the valve in its closed position, a valve stem extending from the valve and through the end of the housing opposite the inlet opening, an arm extending beyond the housing adjacent the valve stem and having a plurality of openings therethrough at different distances from the axis of said stem, a shear pin supported in one of the openings of the arm, and a shear lever arm pivotally connected to the stem outside of the housing and to the shear pin for fracturing said pin in response to predetermined pressure on the piston valve.

11. A valve construction comprising, in combination, a housing provided with an inlet opening aligned with a bore which is closed at its opposite end and a discharge opening intermediate the ends of the bore, a piston valve reciprocable in the bore and arranged normally to close the inlet opening, a valve stem extending from the valve and through the end of the housing opposite the inlet opening, a pair of spaced arms extending integrally beyond the housing adjacent the valve stem and having a plurality of aligned openings therethrough at different distances from the axis of said stem, a shear pin supported in one pair of the openings of the arms, and a shear lever arm positioned between the pair of spaced arms and pivotally connected to the stem outside of the housing and to the shear pin for fracturing said pin in response to predetermined pressure on the piston valve.

12. In a shear-relief valve, a housing, a valve body reciprocable in the housing, a stem extending from one end of the valve body and through the housing, a shearable member, means associated with the housing for holding said shearable member in a plurality of different positions varying in distance from the stem of the valve, and a rigid member pivotally connected at one point to the housing and at another point operatively connected to the shearable member, the stem being arranged to exert a force on said rigid member tending to produce rotation about the point where it is pivotally connected.

13. In a shear-relief valve, a housing having inlet and outlet openings, a valve body reciprocable in the housing and arranged normally to close the inlet opening, a stem extending from one end of the valve body and through the housing, a shearable member, wall means associated with the housing and having a series of openings therein for holding said shearable member in a plurality of different positions varying in distance from the stem of the valve, and a rigid member having a corresponding series of openings pivotally connected at one point to the housing and at another point operatively connected to the shearable member, the stem being arranged to exert a force on said rigid member tending to produce rotation about the point where it is pivotally connected.

14. In a shear-relief valve, an elongated housing having inlet and outlet openings, a valve body reciprocable in the housing and arranged normally to close the inlet opening, an expansible, resilient sealing ring mounted within an end of the housing to engage the valve body in its closing position, a fitting connected to the same end of the housing for retaining the sealing ring in the valve body, a stem extending from the other end of the valve body and through the housing, a shearable member, means associated with the housing for holding said shearable member in a plurality of different positions varying in distance from the stem of the valve, and a rigid member pivotally connected at one point to the housing and at another point operatively to the shearable member, the stem being arranged to exert a force on said rigid member tending to produce rotation about the point where it is pivotally connected.

DOMER SCARAMUCCI.